Figure 1:
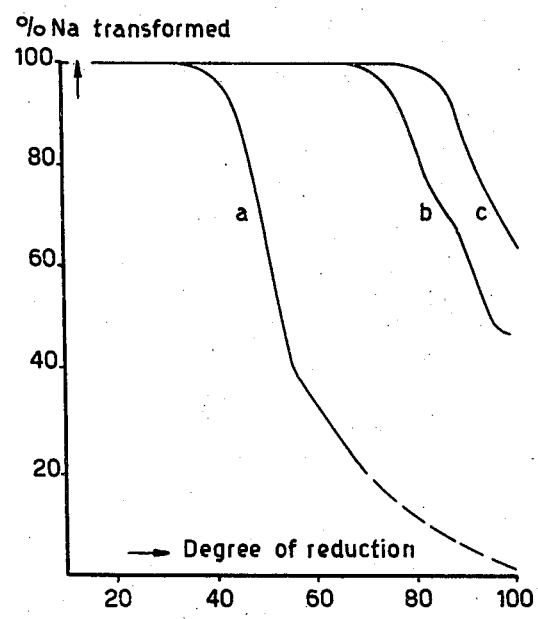

Oct. 25, 1949.  G. HALLIE  2,486,358
REDUCTION OF NITROBENZENE TO HYDRAZOBENZENE
Filed April 6, 1949  2 Sheets-Sheet 1

Inventor:
Gerardus Hallie,
By Cushman, Darby & Cushman
Attorneys.

Oct. 25, 1949.  G. HALLIE  2,486,358
REDUCTION OF NITROBENZENE TO HYDRAZOBENZENE
Filed April 6, 1949  2 Sheets-Sheet 2

Inventor:
Gerardus Hallie,
By Cushman, Darby & Cushman
Attorneys.

Patented Oct. 25, 1949

2,486,358

UNITED STATES PATENT OFFICE 2,486,358

REDUCTION OF NITROBENZENE TO HYDRAZOBENZENE

Gerardus Hallie, Geleen, Netherlands, assignor to de Directie van de Staatsmijnen in Limburg, handelend voor en namens de Staat der Nederlanden, Heerlen, Netherlands Application April 6, 1949, Serial No. 89,614
In the Netherlands April 2, 1948

7 Claims. (Cl. 260—569)

It is a well-known fact that organic and inorganic compounds may be reduced by means of sodium amalgam which is decomposed with water or an aqueous reagent.

This method has chiefly been studied for the reduction of aromatic nitro compounds. In particular, the reduction of nitrobenzene to azo- and hydrazobenzene by means of sodium amalgam has been used, in which the reduction process proper has been combined with the preparation of the amalgam in a chlorine-alkalicel provided with mercury cathodes (cf. Fiat report No. 818).

In this case, the reduction proper is carried out in a reaction vessel into which a quantity of the compound to be reduced is introduced together with sodium amalgam and a decomposition reagent, consisting of dilute lye.

The greatest difficulty encountered in this procedure is caused by the fact that during the reduction process the reacting substances must be put into contact with each other as intimately as possible.

For this purpose the amalgam is put into contact with an intimate mixture of the compound to be reduced and the decomposition reagent or with an emulsion of the compound to be reduced in the decomposition reagent, (British patent specification No. 200,167; German patent specification No. 410,180) or with a solution of said substances in an appropriate solvent (British patent specification No. 203,059). Alternatively, the amalgam may be dispersed in the reacting liquid by means of a stirring device.

The entire procedure is carried out in reaction vessels, specially constructed for the purpose, which are provided with powerful stirring devices for effecting the best contact possible between the heavy amalgam and the emulsion or the solution. These vessels must be made of nickel in order to keep the erosion and the corrosion between reasonable limits; the life of similar costly and specially constructed reactors however, is rather short.

Since only amalgam with a sodium content of appr. 0.1–0.2% can be used for the process (at percentages over 0.5%, amalgam soon passes through a viscous liquid into a solid state) and only part of the amalgam supplied is decomposed within a reasonable length of time, large amounts of amalgam must be used for the reaction.

For this purpose, a continuous flow of amalgam is passed through the reactor, which amalgam gets finely divided on its way through the reacting mixture, fresh alkali metal being subsequently supplied in another apparatus outside the reactor. This requires costly and complicated apparatus.

The capacity of such apparatus is comparatively small, and according to the Fiat report No. 818, only 130 kgs. of nitrobenzene per 8 hours are converted into azobenzene in a reactor with a volume of 750 l.

This is due to the low reaction velocity in the reacting mixture, particularly in the advanced stages of the reduction process. Consequently the complete conversion into hydrazobenzene requires considerably more than (12–13 hours) while a considerable excess of amalgam (up to 80%) must be used in this case.

Efforts for carrying out similar reductions by means of amalgam as a continuous process so that a flow of starting materials enters the reactor as a continuous flow, while a corresponding continuous flow of reaction products is discharged from the reactor, have apparently proved abortive.

In the British patent specification No. 200,167, an apparatus is described in which the emulsion or the solution is circulated while flowing over a layer of amalgam in a thin film, which amalgam may move in the opposite direction at a lower velocity, but the capacity is small.

Therefore, it may be regarded as a considerable improvement that the process according to the invention enables us to make the reductions in question proceed so rapidly that use in a continuous plant is possible and in such a manner that its technical realisation is simple.

The new process is based on the discovery that the reduction of an organic or inorganic compound by means of amalgam proceeds smoothly and practically quantitatively when it is carried out in the presence of a substance by which the decomposition of amalgam is accelerated.

According to the invention, organic and inorganic compounds particularly nitro-compounds are consequently reduced by means of an alkalimetal amalgam and a reagent which is decomposed by the amalgam while hydrogen is set free, by bringing the compound to be reduced, the amalgam and the decomposition reagent together in the presence of a substance or substances by which the decomposition in question is accelerated.

It has been found that all substances having an accelerating effect upon the decomposition of amalgam by means of water or an aqueous reagent, tend to make the reduction process proceed more rapidly. Particularly favourable results have been obtained with carbon and iron, carbon being preferred for several reasons.

Although the continuous reduction of e. g. nitrobenzene to hydrazobenzene carried out in the manner described, proceeds rapidly and smoothly in the presence of iron oxide, hydrogen losses occur because the oxide itself is reduced. Moreover the mercury and particularly the amalgam proves to adhere strongly to the oxide surface, as a result of which a smooth reduction is prevented in the long run and obstructions will occur.

When iron is applied the amalgam is decomposed so quickly that throughout the process hydrogen losses will occur, caused by the development of gas, while the iron itself is slightly amalgamated, finally resulting in a sharp decrease of the activity as well as in the occurrence of mercury losses.

In the application of carbon none of these drawbacks is encountered. With carbon the reduction process proceeds quantitatively and rapidly without any hydrogen losses occurring.

The carbon used may be graphite, coke, electrode carbon, activated carbon, etc., both in a powdery and in a moulded condition. Particularly by means of the two first-mentioned kinds of carbon excellent results have been obtained.

Because of the fact that in the presence of the substances mentioned the reduction proceeds rapidly it proved possible that, when the reduction is performed in a solution the entire process can be carried out in a reaction tower in which the application of expensive stirring devices may be abandoned.

In this way it is possible for nitrobenzene to be reduced rapidly and quantitatively to hydrazobenzene if, after being dissolved in a mixture of ethanol and water with appr. 70% of alcohol, it is exposed to the action of a flow of sodium amalgam in a reaction tower filled up with lumps of graphite or coke.

Moreover the reduction according to this process may be carried out in an entirely continuous manner as will be explained later on.

The discovery that the reduction, especially of nitro-compounds, by means of amalgam proceeds smoothly and quantitatively in the presence of substances having an accelerating effect upon the decomposition of the amalgam, such as carbon and iron, may certainly be called a surprising achievement for it is a well-known fact that in the reduction of aromatic nitro compounds by means of hydrogen the reaction velocity is kept within certain bounds.

This is proved in the electrolytic reduction of an alcoholic solution of nitrobenzene at an iron or nickel cathode, in which by increasing the cathodic current density the formation of atomic hydrogen may be increased practically at choice, but in which over a certain current density no accelerated reduction of nitrobenzene is obtained but only gaseous hydrogen will be formed. Consequently it is impossible in this method to predict the reduction velocity from the velocity at which the hydrogen atoms are formed. A priori, it might be expected, therefore, that above a certain reaction velocity a measure by which a more rapid decomposition of the amalgam is effected would only result in the formation of hydrogen gas and lead to losses. In fact, up till now, no attention has been paid to similar measures in technical procedures and only the laborious and time devouring method described above, which cannot be carried out continuously, is applied.

Moreover it is remarkable that in the reduction of, e. g., nitrobenzene to azo- and hydrazobenzene, no undesirable reductions occur, e. g., to aniline, notwithstanding the highly increased reduction velocity.

The advantages offered by the process according to the invention over the customary reduction by means of amalgam are clearly shown in Figure 1.

These curves were obtained during the reduction of 30 g. of nitrobenzene dissolved in 350 cc. of 70% alcohol, carried out by means of amalgam with a sodium content of 0.24% in a reaction column measuring 1 m. in the length, and 3 cm. in diameter, which was provided with a heating jacket and filled with either an inert or a catalytic material over a length exceeding 90 cm.

The reduction was consequently carried out discontinuously in such a manner that the entire quantity of the solution was introduced into the column with the amalgam flowing through the column at the average rate of 1 kg./min. Sufficient amalgam was supplied in successive portions each containing so much sodium that on the total decomposition of all the amalgam, there would be an excess of 10% needed for the reduction. In this way the theoretical quantity of amalgam was supplied in appr. 15 minutes.

By determining the sodium content of every issued portion of amalgam, the proceeding of the reaction could be followed, because as will be clear, the amount of sodium absorbed from every portion forms a measure for the proceeding of the reduction, provided naturally that no hydrogen gas escapes (which can easily be checked).

Assuming the degree of reduction for the nitrobenzene itself to be 0 and 100 for the hydrazobenzene, the degrees of reduction for azoxy and azobenzene will be 60 and 80 respectively. The curves represent the percentage of sodium present in every portion, which has been absorbed, as a function of the degree of reduction of the reacting mixture.

Curve $a$ holds for the case when the filling material of the column consists of an indifferent substance (acid resisting bricks), curve $b$ for a filling material consisting of lumps of graphite, curve $c$ for a filling of lumps of graphite, which previously have been immersed for 60 hours in a 10% ferric chloride solution and subsequently rinsed with water and finally dried at 100° C.

From the course of the reaction curves it follows that, independent of the character of the filling material, the amalgam reacts very rapidly with an alcoholic solution of nitrobenzene and that the reaction velocity is very satisfactory, also at a slight degree of reduction, but that as the reduction proceeds, considerable differences occur between the reaction velocities for different filling materials.

Curve $a$ shows that when the filling consists of an indifferent substance, the sodium is already no longer absorbed quantitatively at a degree of reduction of 40 and that above this degree the absorption capacity decreases very rapidly, so that, e. g., at a degree of reduction of 68, only 22% of the sodium supplied is used. It proves that under these conditions it is only possible to obtain a complete reduction if a very long reaction time is applied and a large excess of amalgam is made to react, as is customary already in technical procedures.

Curve $b$, which concerns a filling material consisting of lumps of graphite, shows an entirely different picture. The sodium supplied is quantitatively absorbed up to a degree of reduction 70, after which the reduction velocity drops but nevertheless a complete reduction to hydrazobenzene is reached at a reasonable velocity. A slight excess of amalgam (up to appr. 15%) promotes this result which, in the case of an indifferent filling material under the same conditions, cannot even be reached when using an excess of 100%.

Further it proved that only when a degree of reduction 95 was reached and exceeded, some hydrogen gas was formed, by which however practically neither losses nor difficulties, as regards frothing of the reaction mixture, were caused.

Finally, curve c shows that even more favourable results are obtained if the filling material consists of graphite which has previously been treated with an iron salt in the way described. Since in this case the development of gas increases in the higher stages of the reduction, the quantity of promoting material must be adapted to the technical conditions.

In connection herewith it has been found that in the reduction of nitrobenzene the iron content of the carbon used must preferably lie below 1% if, in the final stage of the reduction, difficulties caused by the development of hydrogen are to be avoided.

As already stated before, a special advantage of the new process consists in the fact that it can be carried out continuously.

This is achieved by bringing a solution, containing the compound to be reduced and the decomposition reagent, continuously together with the amalgam in a certain volume of the reaction mixture, while a quantity of the reaction products, corresponding with the starting materials which are supplied simultaneously, is continuously withdrawn from said mixture.

In this way, the reduction of nitrobenzene to hydrazobenzene may smoothly and continuously be carried out as an entirely continuous process in a carbon filled reaction column. The amalgam is continuously introduced into the top of the column, the solution containing the nitrobenzene and water being supplied to the lower part, while a volume of the reacted mixture, corresponding with the amount of nitrobenzene, simultaneously supplied to the lower part, is continuously discharged through the top, the dilute lye formed being discharged from the lower part of the column.

Figure 2:
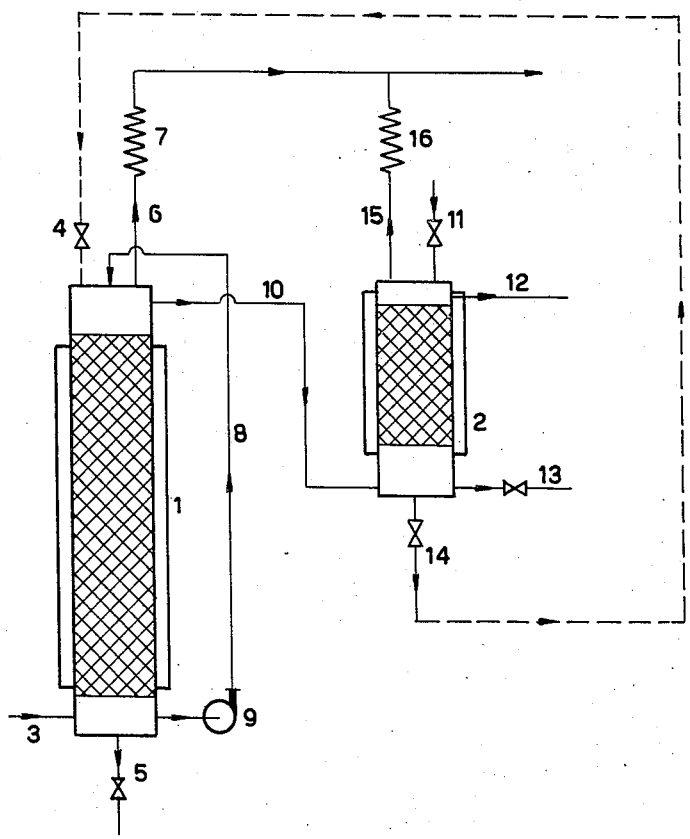

An appropriate apparatus for a similar continuous process is schematically outlined in Fig. 2, in which the reduction is carried out in two stages and the amalgam and the solution of nitrobenzene in aqueous alcohol move in counter-current through the columns.

The apparatus chiefly consists of two reaction columns, a long column 1 and a shorter one 2, each provided with a heating or cooling jacket.

The first column is provided with feed pipes for the nitrobenzene solution 3 and the amalgam 4 and with discharge pipes for the mercury 5, and for the escaping gases and vapours 6, a cooler 7 being inserted in the latter pipe. By means of a pump 9 the reacting mixture can be circulated through a pipe 8. Through a pipe 10 the reaction mixture continuously flows into the second column, which is also provided with a supply pipe 11 for amalgam, with discharge pipes for the hydrazobenzene solution 12, for dilute lye 13, for amalgam 14 and for the vapours and gases formed 15, while also here a cooler 16 is inserted in the latter pipe.

A considerable part of the two columns is filled up with carbon, e. g., graphite or coke, whether or not subjected to a preliminary treatment.

The first column contains a reaction mixture, the degree of reduction of which amounts to appr. 80, and which consists of an emulsion of an alcoholic azobenzene-solution with lye (concentration 25–30%), which is kept as homogeneous as possible by circulating it through the pipe 8. A solution of nitrobenzene in alcohol (concentration 70%) is continuously supplied through the pipe 3, the amalgam being introduced through the pipe 4, the dosages being regulated in such a manner that the degree of reduction of appr. 80 of the mixture in the reaction column is maintained.

The temperature in this column amounts to 60° C. and is kept constant by means of the cooling jacket. In this stage, the reduction proceeds very rapidly and quantitatively, so that the mercury discharged through the pipe 5 is practically free of amalgam, with no hydrogen gas being formed.

From the top of the first column the emulsion passes over continuously into the lower part of the column 2 through the pipe 10. 90% of the dilute lye which separates in the following final stage has already been formed in the first column. The emulsion is sufficiently separated to keep the heavier lye in the lower part of the column 2, from where it is continuously discharged through the pipe 13.

The lighter solution of azobenzene ascends through the second column and is further reduced by means of the amalgam supplied through the pipe 11, the inflowing quantity of amalgam being regulated in such a manner that the hydrazobenzene solution, continuously leaving through the pipe 12, is colourless.

The temperature in said smaller, second column in which chiefly the azo compound is reduced to the hydrazo compound is kept at 80° C.

In a smooth reduction to hydrazobenzene a small amount of hydrogen gas is formed in this column, corresponding with appr. 1 or 2% of the total quantity of amalgam supplied.

Whereas, as stated before, the mercury drained from the column 1 is practically free of amalgam, an appreciable amount of amalgam is not retained by the second column, viz. 50% of the amount supplied, when operating with sodium amalgam with a concentration of 0.2%. For this reason the mercury, drained through the pipe 14, is passed again through the column 1 (as indicated by the dashed line in Fig. 2) in which it is fully exhausted.

In this way the amalgam available may be completely utilized, by supplying appr. 60% of it directly to the column 1, appr. 40% being first passed through the column 2 and subsequently through the column 1.

The use of alcohol of appr. 70% as a solvent for the nitrobenzene in this process offers special advantages since it has proved that in this case the reaction mixture is easily separated, while also lye of an attractive concentration (appr. 30%) is formed.

Moreover, at low temperatures hydrazobenzene is hardly soluble in a similar alcohol (the concentration of which is adjusted in the column to 80%); azo-benzene on the other hand is readily soluble so that the separation of hydrazobenzene and azobenzene, if present, can easily be carried out simply by cooling the alcoholic solution of the reaction products, discharged through the pipe 12, during which only the hydrazobenzene crystallizes.

It goes without saying that in the way described this and similar reactions may also be carried out by means of two or more reaction columns installed behind or upon each other.

Because of the fact that water is continuously withdrawn from the reaction liquid together with the drawn-off lye, water must be replenished in one or more of the columns in order to keep the concentration in the water-alcohol mixture at the suitable level.

If, under certain conditions, the final product should still contain azobenzene, its alcoholic solution, resulting after the crystallisation of the hydrazobenzene, may be reversed into one of the preceding columns. The product of the nitrobenzene reduction described consists practically quantitatively of hydrazobenzene; only a very small percentage (0.1%) of aniline is formed.

The capacity of such apparatus for carrying out these reductions continuously is considerably greater than of the apparatus which have been applied so far. By means of three columns installed behind each other, each having a capacity of 150 l. (height 2 m., diameter 30 cm.) 1250 kgs. of hydrazobenzene per 24 hours can be produced in a continuous process without any difficulty.

The continuous process may also be applied in other apparatus, e. g., in stirring vessels.

It has been found that the process according to the invention may be applied successfully in the reduction of all kinds of organic compounds, especially of nitro compounds, of aromatic and aliphatic ketones and aldehydes to the corresponding alcohols, and the like, while also the preparation of sodium hydrosulphite by means of the reduction of sodium bisulphite, carried out in the manner described, proceeds excellently.

I claim:

1. A process for the reduction of nitrobenzene to hydrazobenzene which comprises bringing an aqueous alcohol solution of nitrobenzene together with a liquid amalgam of an alkali metal containing about 0.1 to 0.2% alkali metal in contact with carbon, allowing said materials to react in the presence of the carbon and recovering the hydrazobenzene thus formed.

2. A process as claimed in claim 1, wherein said carbon is in the form of graphite.

3. A process as claimed in claim 1, wherein said carbon is in the form of coke.

4. A process as claimed in claim 1, wherein said carbon is in the form of lumps of graphite impregnated with ferric chloride.

5. A process as claimed in claim 1, wherein said aqueous alcohol solution is a solution of nitrobenzene in a mixture of ethanol and water.

6. A process as claimed in claim 1, wherein the reduction is carried out in a plurality of stages with the amalgam flowing in countercurrent to said organic nitro compound in said stages.

7. A process for the reduction of nitrobenzene to hydrazobenzene which comprises bringing a solution of nitrobenzene in a 50–80% aqueous alcohol solution into contact with a sodium amalgam of 0.1–0.2% sodium in the presence of carbon, allowing said amalgam and nitrobenzene to react in the presence of the carbon until 98% of the nitrobenzene has been reduced to hydrazobenzene, and separating the hydrazobenzene from the alcoholic solution by cooling the solution.

GERARDUS HALLIE.

REFERENCES CITED

The following references are of record in the file of this patent:

FOREIGN PATENTS

| Number  | Country       | Date          |
|---------|---------------|---------------|
| 200,167 | Great Britain | July 3, 1923  |
| 203,159 | Great Britain | Sept. 3, 1923 |
| 105,706 | Switzerland   | July 1, 1924  |
| 410,180 | Germany       | Mar. 2, 1925  |
| 552,147 | Great Britain | Mar. 24, 1943 |

OTHER REFERENCES

Chemical Abstracts, vol. 18 (1924), page 1912.